Figure 1:
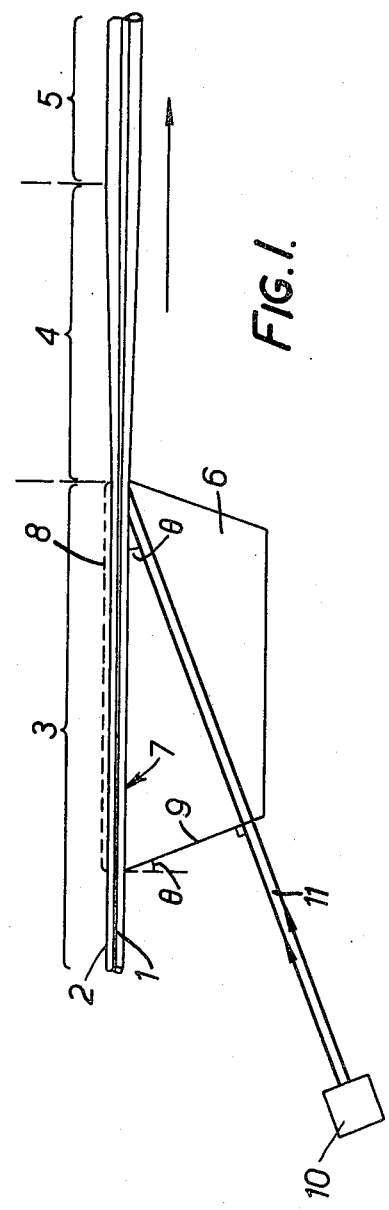

United States Patent [19]

Jackson et al.

[11] 4,125,768
[45] Nov. 14, 1978

[54] APPARATUS FOR LAUNCHING OR DETECTING WAVES OF SELECTED MODES IN AN OPTICAL DIELECTRIC WAVEGUIDE

[75] Inventors: Lynden A. Jackson; John E. Midwinter, both of Ipswich, England

[73] Assignee: Post Office, London, England

[21] Appl. No.: 848,362

[22] Filed: Nov. 3, 1977

Related U.S. Application Data

[63] Continuation of Ser. No. 640,770, Dec. 15, 1975, abandoned.

[30] Foreign Application Priority Data

Dec. 18, 1974 [GB] United Kingdom ............... 54764/74

[51] Int. Cl.$^2$ ........................... G02B 5/14; H01J 5/16; H01J 39/12
[52] U.S. Cl. ................................. 250/227; 350/96.19
[58] Field of Search ............ 350/96 WG, 96 C, 96.19; 250/227

[56] References Cited

U.S. PATENT DOCUMENTS

| 3,455,625 | 7/1969 | Brumley et al. | 350/96 C |
| 3,586,872 | 6/1971 | Tien | 350/96 WG |
| 3,610,727 | 10/1971 | Ulrich | 350/96 WG |
| 3,617,109 | 11/1971 | Tien | 350/96 WG |
| 3,777,149 | 12/1973 | Marcatili | 350/96 WG |
| 3,810,688 | 5/1974 | Ballman et al. | 350/96 WG |
| 3,832,567 | 8/1974 | Jacques et al. | 350/96 WG |
| 3,905,676 | 9/1975 | Ulrich | 350/96 C |
| 4,060,308 | 11/1977 | Barnoski et al. | 350/96 C |

Primary Examiner—Alfred E. Smith
Assistant Examiner—David K. Moore
Attorney, Agent, or Firm—Hall & Houghton

[57] ABSTRACT

A launcher for waves of selected mode in an optical dielectric waveguide having a core surrounded by cladding, in which the launcher includes a prism of refractive index greater than that of the waveguide and preferably greater than that of the core of the waveguide which is placed against the waveguide either before or alongside an outwardly tapering portion of the waveguide. Light from a laser is directed through the prism on to the waveguide to induce the waves in the waveguide. A matching fluid, which may set to a solid, improved the coupling of the prism to the waveguide. A detector of similar construction is also described, the tapering of the waveguide being inward.

12 Claims, 2 Drawing Figures

APPARATUS FOR LAUNCHING OR DETECTING WAVES OF SELECTED MODES IN AN OPTICAL DIELECTRIC WAVEGUIDE

This is a continuation, of application Ser. No. 640,770 filed Dec. 15, 1975 and now abandoned.

This invention relates to apparatus for launching or detecting waves of selected modes in an optical dielectric waveguide.

An optical dielectric waveguide typically consists of a transparent core having a first refractive index ($n_1$) surrounded by a cladding which is also transparent and has a second refractive index ($n_2$) lower than that of the core; both parts may be of sodium borosilicate glasses. This structure is usually of very small circular cross-section having an outer diameter of, say, 70 to 100 μm and a core diameter of, say, 12 μm, and may be referred to as a fibre. A modulated light beam can be propagated along the guide in one of different modes analogous to the modes of a radio signal propagated along a conventional radio signal waveguide. The order of a mode may be considered as being dependent on the angle of the light rays within the guide relative to the core-cladding interface, although it must be appreciated that in this, as in other matters discussed subsequently, the laws of geometrical optics do not apply strictly within waveguides of this nature, but it is believed that such illustrations would be found helpful in understanding the present invention without the difficulty of a detailed theoretical exposition. The first order mode consists of a plane wave propagated parallel to the axis of the guide and modes near cut-off have angles to the core-cladding interface which are close to the critical angle for total internal reflection at the core-cladding interface.

It is well known to launch an optical signal along an optical waveguide by applying light from a source of the signal directly to an end of the guide, but the way in which the light propagates along the guide is not completely determined by such an arrangement, so as to make it possible to transmit a predetermined mode in the guide.

It is an object of the present invention to provide apparatus which is capable of launching a wave of a selected mode in an optical dielectric waveguide and which overcomes the disadvantages just described.

According to the present invention there is provided apparatus for launching or detecting radiation in selected modes of propagation in an optical dielectric waveguide having a core surrounded by cladding, said apparatus including a tapered section of waveguide, long compared with the wavelength of the radiation and a prism of refractive index greater than that of the cladding of the waveguide having a first surface located alongside the waveguide either at the narrow end of the tapered section or overlapping the tapered section and optically coupled to the waveguide, and a second surface through which a light beam can pass either towards the waveguide to induce therein at the broad end of the tapered section radiation propagating away from the tapered section in a selected mode, or away from the waveguide due to radiation propagating towards the tapered section in a selected mode in the waveguide at the broad end of the tapered section, at least part of the tapered section lying between the point of incidence or emergence of the light beam on the waveguide and the broad end of the tapered section.

The tapering of the waveguide serves to change the cut-off mode of radiation propagating in the guide, a tightly bound mode being changed to a weakly bound mode with reduction in the diameter of the guide. The cut-off mode is that mode at which radiation ceases to be bound to the waveguide. As a result of this the different modes propagated along a guide will penetrate the outer boundary of the guide at different locations along the taper and consequently be detectable at different places along the taper.

A mode of propagation of radiation in a waveguide is referred to as weakly bound if a significant amount of the radiation can leave the waveguide when only a relatively small physical change is made to the waveguide, for example by bending it or tapering it inwardly by a small amount, or by slightly increasing the refractive index of the coating. A tightly bound mode of propagation is one in which the significant amount of radiation cannot be induced to leave the waveguide unless a relatively large physical change is made to the waveguide, which change would cause most of the radiation in a weakly bound mode to leave the waveguide.

An index matching substance may be provided between the prism and the waveguide; this may be a fluid. Alternatively the index matching substance may be a substance which was initially fluid and therefore able to flow into close contact with both the prism and the waveguide but which subsequently solidifies.

Figure 2:
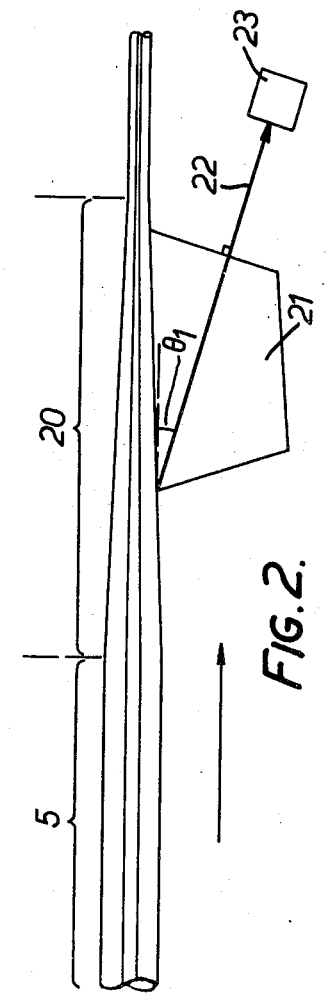

In order that the invention may be fully understood and readily carried into effect it will now be described with reference to the accompanying drawing, of which, FIG. 1 is a diagram of apparatus for launching a wave of a selected mode in an optical waveguide; and FIG. 2 is a diagram of apparatus for detecting a wave of a selected mode in an optical waveguide.

FIG. 1 shows a section of optical dielectric waveguide consisting of a core 1 of refractive index $n_1$ and a cladding 2 of refractive index $n_2$, smaller than $n_1$. The core is of circular cross-section and the cladding is of annular cross-section. A first section 3 of the waveguide is of constant, relatively small cross-sectional area, a second section 4 is outwardly tapering and a third section 5 is of larger substantially constant cross-section area. A prism 6 of refractive index $n_4$ greater than the refractive index $n_2$ of the cladding 2, and preferably, but not essentially, greater than $n_1$, the refractive index of the core 1, has a first plane surface 7 against the first section 3 of the waveguide and index matching fluid 8 is used to ensure the optical coupling of the prism 6 to the cladding 2 of the waveguide. An end face or second surface 9 of the prism 6 is at an angle θ to a plane normal to the first section 3 of the waveguide. A laser 10 is used to produce a light signal which is directed along a line 11 approximately normal to the second surface 9 so that the light impinges on the surface 7 of the prism 6 where the first portion 3 of the waveguide is in contact with it at the angle θ. A cylindrical lens can be employed to spread the light from the laser 10 into a line. The light signal from the laser 10 is injected into the waveguide and initially is propagated in a weakly bound mode close to the cut-off mode, but as it passes through the outwardly tapering section 4 the cut-off mode is changed so that the light propagates in a tightly bound mode.

It can be shown that with apparatus of FIG. 1 a light signal can be injected into a waveguide and propagated in a particular mode if $$\cos\theta = (n_4 \cdot k_0)/\beta_z$$

where
$k_0$ is the free space propagation constant in vacuo and
$\beta_z$ is the phase constant of the mode of propagation in the waveguide in that section of the taper.

The third section 5 of the waveguide is used for the transmission of the optical signal to a remote point and may include further outwardly tapering portions to permit the introduction of optical signals propagated in other modes along the guide. Typically the narrower outside diameter of the waveguide is 12 to 15 $\mu$m with a narrower core diameter of 3 $\mu$m, say. The waveguide tapers outwardly to have an outside diameter of, say, 70–100 $\mu$m and a core diameter of, say, 12 $\mu$m.

FIG. 2 is a diagram showing apparatus similar to that of FIG. 1 used for detecting an optical signal of a particular mode in a waveguide. In FIG. 2 the third section 5 of the waveguide, shown in FIG. 1, is shown as continuing to an inwardly tapering section 20 against which is placed a prism 21 similar to the prism 6. A line 22 indicates a light ray derived from the selected mode in the waveguide which is shown as impinging on a suitable photodetector 23. The equation given above gives the angle $\theta_1$ at which the light ray leaves the waveguide and enters the prism 21. It will be appreciated that as an outwardly tapering section of waveguide increases the binding of a given mode of propagation so an inwardly tapering section decreases the binding of a given mode of propagation. It can be seen therefore that for a given angle $\theta_1$ of a light ray in the prism 21 there will be a particular position along the tapering section 20 at which a particular mode in the section 5 of the waveguide will be extracted from the guide.

It can be shown that the energy in a particular mode in the waveguide is not uniformly distributed about its axis but has a number of maxima and minima distributed at different azimuthal angles and consequently it may be important to position the prism 21 to extract light from an azimuthal angle where a maximum of energy can be obtained. Similarly the laser beam or the prism 6 should be located at a particular azimuthal angle to provide the most effective coupling of the light energy, i.e. to match the radiation field pattern from the laser 10 into the waveguide.

Preferably some covering such as, for example, a cover slide should be placed over the waveguide where it lies on the prisms 6 and 21 to retain the index matching fluid in the region of the waveguide. Such fluid should of course also be used in conjunction with the prism 21. Fine adjustment of the refractive index of the matching fluid can, in some instances, at least, be obtained by varying its temperature. If desired some means may be provided for locating the waveguide on the surface of the prisms 6 and 21 so as to avoid inadvertent displacement. The index matching fluid may be a substance which hardens to an amorphous solid and this may be used to effect the location of the guide on the prisms.

Although in FIG. 1 the prism 6 is shown located against a narrow section of waveguide of substantially constant cross-sectional area, it may be arranged to overlap partially or wholly the outward tapering section. Similarly the prism 21 of FIG. 2 may be located against a relatively narrow section of waveguide of substantially constant cross-section instead of overlapping the tapering section as shown. The faces of the prisms 6 and 21 through which light is not required to pass in the operation of the apparatus may be silvered to prevent the ingress of stray light. Moreover the entire apparatus, apart from the waveguide coupling the launcher-detector may be placed in a suitable light-tight box.

With regard to the tapered sections of the waveguide, these could be produced by carefully drawing the waveguide after heating. Preferably the tapers are substantially linear, but this is not essential to the operation of the invention.

Although the invention has been described with reference to two embodiments, it will be appreciated that many changes could be made in the configurations shown without departing from the invention. For example, as shown and described the light beams pass normally through the surface of the prism; it is not essential that the light beams should be normal to the surface provided that the resulting refraction is allowed for in the construction of the apparatus.

The exciting and emerging light beams need not lie in a plane containing the waveguide which is at right angles to the first surface of the prism against which the waveguide is located. This departure from a right angle determines by the projection of the light beam on to the first surface of the prism a skew angle and its choice may be critical in certain instances to obtain single mode excitation and response, for example, where the mode required is one of a degenerate pair of modes.

We claim:

1. Apparatus for launching or detecting radiation in selected modes of propagation in an optical dielectric fibre waveguide having a core surrounded by cladding, said apparatus including a tapered section of waveguide in which the transverse dimension of at least the core of the waveguide is progressively reduced relative to that of the main length of the waveguide to such an extent that radiation propagating in a selected tightly bound mode in the main length of the waveguide would lose a significant amount of energy into the cladding of the waveguide as a result of the tapering of the tapered section, the tapered section being long compared with the wavelength of the radiation, and a prism of refractive index greater than that of the cladding of the waveguide having first and second surfaces, the first surface being located alongside the waveguide, adjacent the narrow end of the tapered section and optically coupled to the waveguide, and the second surface being such that a light beam can pass through it towards the waveguide to induce in the main length of the waveguide radiation propagating away from the tapered section in the selected mode, and can pass through it away from the waveguide due to radiation propagating towards the tapered section in the selected mode in the main length of the waveguide, at least part of the tapered section lying between the point of incidence and emergence of the light beam on the waveguide and the broad end of the tapered section.

2. Apparatus according to claim 1 including a laser arranged to direct a light beam substantially normally through the second surface of the prism at a position chosen to induce radiation having a selected mode of propagation in the waveguide.

3. Apparatus according to claim 1 including radiation detector means arranged to receive radiation from the waveguide through a location on the second surface chosen so that only radiation having selected mode of propagation in the waveguide can impinge on the radiation detector.

4. Apparatus according to claim 1 wherein an index matching substance is disposed between the prism and the waveguide.

5. Apparatus according to claim 4 wherein the index matching substance is a liquid.

6. Apparatus according to claim 4 wherein the index matching substance is a liquid when placed between the prism and the waveguide but it subsequently hardens to a solid.

7. A method of launching radiation in selected modes of propagation in a main part of an optical dielectric fibre waveguide having a core surrounded by cladding, the method including generating light radiation, passing the radiation through the cladding of the waveguide so that the radiation propagates in the core in a first, weakly bound, mode of propagation by means of a prism adjacent to the waveguide into a first part of the waveguide and transforming the mode of propagation of the radiation from the first mode into a selected and more strongly bound mode by passing the radiation in the waveguide through an outwardly tapering section of the waveguide in which the transverse dimension of at least the core is progressively increased from that at the first part of the waveguide to that in the main part of the waveguide.

8. A method according to claim 7 wherein the first mode of propagation is a weakly bound mode close to the cut-off mode at the part of the waveguide where it is induced.

9. A method according to claim 7 wherein the radiation is applied to the waveguide through a prism of refractive index higher than that of the cladding of the waveguide placed alongside the waveguide.

10. A method of detecting radiation in selected modes of propagation in a main part of an optical dielectric fibre waveguide having a core surrounded by cladding, the method including transforming the mode of propagation of radiation in the waveguide from a selected mode to a second and weakly bound mode by passing the radiation in the waveguide through an inwardly tapering section of the waveguide in which the transverse dimension of at least the core of the waveguide is progressively reduced from that in the main part of the waveguide, and detecting radiation passing from the core through the cladding of the waveguide at a position in a relatively narrow part of the waveguide by means including a prism adjacent to the waveguide and a light radiation detector located so that radiation passing through the prism from the cladding of the waveguide will impinge on the detector.

11. A method according to claim 10 wherein the second mode of propagation is a weakly bound mode close to the cut-off mode at the position along the waveguide at which it is detected.

12. A method according to claim 10 wherein radiation is derived from the waveguide at the position along the waveguide by means of a prism of refractive index greater than that of the cladding of the waveguide placed alongside the waveguide.

* * * * *